United States Patent [19]

Enomoto et al.

[11] 4,429,965

[45] Feb. 7, 1984

[54] PHOTOGRAPHIC CAMERA OF AUTOMATIC FOCUSSING TYPE

[75] Inventors: Shigeo Enomoto, Tokyo; Mitsuhiko Shimoda, Asaka, both of Japan

[73] Assignee: Asahi Kogaku Kogyo Kabushiki Kaisha, Tokyo, Japan

[21] Appl. No.: 314,487

[22] Filed: Oct. 23, 1981

Related U.S. Application Data

[63] Continuation-in-part of Ser. No. 218,491, Dec. 19, 1980, abandoned.

[30] Foreign Application Priority Data

Dec. 27, 1979 [JP] Japan .................................. 54-173826

[51] Int. Cl.³ .................................................. G03B 3/10
[52] U.S. Cl. .................................................. 354/402
[58] Field of Search ..................... 354/25, 195, 286; 352/140; 355/56

[56] References Cited

U.S. PATENT DOCUMENTS

| | | | |
|---|---|---|---|
| 4,118,713 | 10/1978 | Murakami et al. | 354/286 X |
| 4,174,892 | 11/1979 | Osawa | 354/25 |
| 4,239,357 | 12/1980 | Iida | 354/25 |
| 4,303,321 | 12/1981 | Enomoto et al. | 354/25 |

Primary Examiner—Michael L. Gellner
Attorney, Agent, or Firm—Christie, Parker & Hale

[57] ABSTRACT

An exchangeable lens photographic camera of automatic focussing type capable of focussing objects between a minimum and an infinite focussing distance. The camera has an exchangeable lens exchangeable in the camera body. The lens has a first switch providing a signal associated with focussing an object at the infinite distance, and a second switch providing a signal associated with focussing an object at the minimum distance. A focussing motor is coupled to the lens for moving the lens for focussing objects lying between the minimum and infinite distances. A first pair of contacts coupled between the exchangeable lens and the camera body transmits therebetween signals indicating the presence and direction of rotation of the focussing motor. A second pair of contacts, coupled between the exchangeable lens and the camera body, transmits the signals produced by the first and second switches from the exchangeable lens to the camera body. The first and second pairs of contacts are oriented on the exchangeable lens relative to each other for providing signal coupling between the exchangeable lens and the camera body.

10 Claims, 11 Drawing Figures

AMOUNT LENS MOVEMENT

| Zone | g | d | f | e | h |
|---|---|---|---|---|---|
| 16 Output | H | L | H | H | H |
| 17 Output | H | H | H | L | H |
| 20 Output | L | H | H | H | L |

| moving Direction | Infinite | stop | minimum distance |
|---|---|---|---|
| 28 Output | L | H | H |
| 29 Output | H | H | L |

PHOTOGRAPHIC CAMERA OF AUTOMATIC FOCUSSING TYPE

CROSS-REFERENCE TO RELATED APPLICATIONS

This application is a continuation-in-part of application Ser. No. 218,491, filed Dec. 19, 1980, now abandoned.

U.S. application Ser. No. 117,589, filed Feb. 1, 1980, U.S. Pat. No. 4,352,545, in the names of Harumi Aoki, Masao Jyojiki and Naoyuki Uno and assigned to Asahi Kogaku Kogyo Kabushiki Kaisha, the same assignee of this application, is related to this application.

U.S. application Ser. No. 117,932, filed Feb. 4, 1980, U.S. Pat. No. 4,320,946, in the names of Harumi Aoki, Katsuhiko Miyata and Yoshio Sawada and assigned to Asahi Kogaku Kogyo Kabushiki Kaisha, the same assignee of this application, is related to this application.

U.S. application Ser. No. 218,440, filed Dec. 19, 1980, U.S. Pat. No. 4,303,321, in the names of Shigeo Enomoto and Mitsuhiko Shimoda and assigned to Asahi Kogaku Kogyo Kabushiki Kaisha, the same assignee of this application, is related to this application.

These cross-referenced applications are incorporated by reference, in their entirety, in this application.

BACKGROUND OF THE INVENTION

Several focussing detectors have been proposed in which, for example, a non-linear characteristic of cadmium sulfide (CdS) exposed to light is utilized where a plurality of minor photoconductive elements are arranged to extract a contrast of images on the surfaces of these elements from an object to be photographed. In using any one of these proposed photoelectric focussing detectors for a single lens reflex camera, the photoelectric focussing detector has usually been located at a position optically equivalent to the film defined plane with respect to the reflective mirror disposed in the path of light coming through an objective lens from an object to be photographed. With such arrangement for a photoelectric focussing detector, the detector is responsive only to the movement of the objective lens for generating a focussing signal so that the mechanical structure of the lens system suffer from several disadvantages. Namely, when the objective lens is out of focus, the image of an object to be photographed is also out of focus, and no signal indicating such out of focus is generated by the focussing detector. Additionally, a slight movement of the objective lens from this state causes no variation in the output of the focussing detector. Accordingly, it is impossible to determine the direction in which the objective lens should be moved in order to obtain proper focussing.

Typically, photoconductive elements arranged for use in a focussing detector provide a response characteristic as a function of the position of the objective lens that defines non-responsive zones about either side of a responsive zone within which the point of proper focussing exists. It is possible within the respective zone to move the objective lens to the focussing position based upon determination of the direction in which the output of the focussing detector varies as the objective lens is moved, whereas, it is impossible within the non-responsive zones to determine the direction in which the objective lens may be moved in order to bring the lens to the focussing position since no variation occurs in the output of the focussing detector. With the photographic camera of the automatic focussing type utilizing the photoelectric focussing detector as mentioned above, there occurs a probability of 50% at which the objective lens is moved in the direction opposite to the proper focussing position when the objective lens lies initially within any one of the non-responsive zones.

An object of the present invention is to realize a photographic camera of automatic focussing type utilizing a photoelectric focussing detector in which a simplified mechanical structure is utilized and the foregoing described problems are minimized.

In accordance with the present invention, the objective lens lying initially within any one of the non-responsive zones is moved at a high velocity to move the objective lens out of the non-responsive zone within a relatively short period of time even if the objective lens has been moved in the direction opposite to the focussing position. A switch associated with focussing an object at the infinite distance or a switch associated with focussing an object at the minimum distance reverses an objective lens moving focussing motor upon arrival of the objective lens at the position for photographing an object at infinity or the minimum distance so as to reverse the movement of the objective lens into the proper direction. When the objective lens being moved at such high velocity enters into the responsive zone, the speed of moving the objective lens is reduced in order to provide focussing position and to prevent the objective lens from moving beyond the focussing position due to its inertia. Thus, hunting or oscillation of the objective lens relative to the focussing position is prevented and the objective lens stops at the focussing position.

SUMMARY OF THE INVENTION

Briefly, the invention contemplates an exchangeable lens photographic camera of the automatic focussing type. The camera is capable of focussing objects that lie between a minimum and an infinite focussing distance. The camera includes an exchangeable lens exchangeable in a camera body. The lens has a first switch for providing a signal associated with focussing an object at the infinite distance, and a second switch for producing a signal associated with focussing an object at the minimum distance. A focussing motor is coupled to the lens for moving the lens for focussing objects lying between the minimum and infinite distance. Electrical drive means are provided for driving the focussing motor. Signals are provided for indicating the presense and direction of rotation of the focussing motor. A first pair of contacts, coupled between the exchangeable lens and the camera body, transmits between the camera body and the exchangeable lens signals indicating the presence and direction of the rotation of the focussing motor. A second pair of contacts, coupled between the exchangeable lens and the camera body, transmits the signals produced by the first and second switches. The first and second pairs of contacts are oriented on the exchangeable lens relative to each other for providing signal coupling between the exchangeable lens and the camera body.

BRIEF DESCRIPTION OF THE DRAWINGS

FIGS. 8(a)-(b) show the output waveform and scanning pulse train respectively of a scan initiating signal oscillator for the image sensor of self-scanning type;

DETAILED DESCRIPTION

Figure 1:
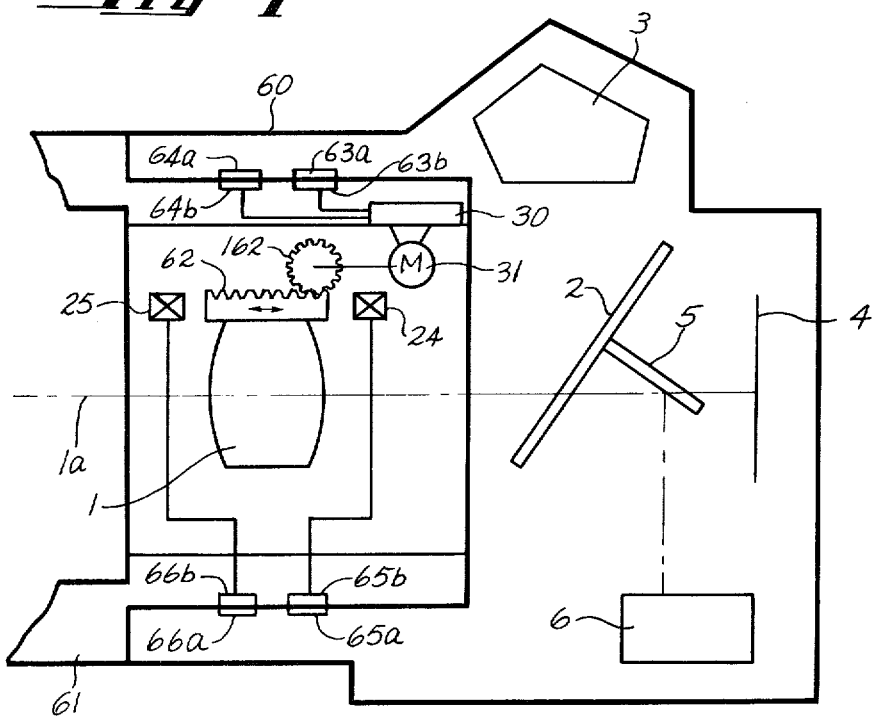
FIG. 1 is a schematic arrangement of a photoelectric focussing detector.

Referring now to FIG. 1, there is shown in schematic the lens and photoelectric focussing detector portion of an automatic focussing type photographic camera of the present invention. An objective lens 1 has an axis 1a normal to a film plane 4 that defines a plane in which photographic film is advanced. The pentaprism 3 is located above a quick return mirror 2 and is adapted in cooperation with the mirror 2 for single lens reflex type viewing through objective lens 1. A reflective mirror 5 cooperates with the quick return mirror 2 for reflecting light rays coming from an object through the objective lens 1 to a photoelectric focussing detector 6. The objective lens 1 is adapted for translation within a photographic camera body 60 along axis 1a. Mirror 2, pentaprism 3, film plane 4, mirror 5, and detector 6 are all mounted in a camera body 60. Lens 1 is mounted in a lens housing 61, which removably fits into the front of camera body 60. In lens housing 61, a rack 62 is fixed to lens 1, a motor drive circuit 30 controls a reversible focussing motor 31, and motor 31 is mechanically coupled to a pinion 162, which engages rack 62. Limit switches 24 and 25 are disposed in the path of rack 62 at the lens position for photographic objects at infinite distance and at the minimum distance, respectively. Focus control circuitry described below in connection with FIG. 5, which is located in the camera body, is connected through contact pairs 63a,63b and 64a,64b to motor drive circuit 30 and through contact pairs 64a,65b and 66a,66b to limit switches 24 and 25, respectively. Contacts 63a, 64a, 65a, and 66a are mounted at the surface of the lens receiving portion of camera body 60 and contacts 63b, 64b, 65b, and 66b are mounted at the surface of lens housing 61. The exact locations of the contacts is a matter of choice. One choice is shown in Okura et al. application Ser. No. 237,987, filed on Feb. 25, 1981. Each of the interchangeable lenses to be used with camera body 60 has the components shown in FIG. 1. When one of such interchangeable lenses is installed in camera body 60, electrical connections are established between contact pair 63a,63b between contact pair 64a,64b, between contact pair 65a,65b, and between contact pair 66a,66b.

Figure 2:
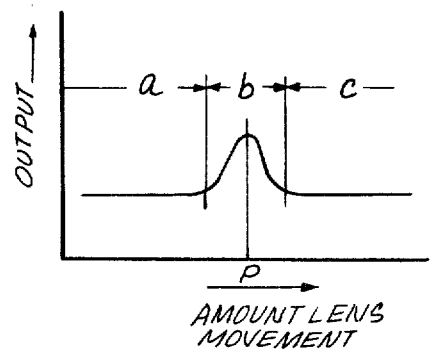
FIG. 2 is a diagram illustrating the output of a photoconductive element used in the photoelectric focussing detector of FIG. 1 as a function of the movement of the objective lens.

FIG. 2 represents the intensity of the output from the photoelectric focussing detector 6 as the objective lens 1 translates along the axis 1a for achieving proper focussing. In the embodiment shown in FIG. 1, the quick return mirror 2 is partially formed as a half mirror, and with such arrangement, the photoelectric focussing detector 6 is responsive only to the light rays passing through the objective lens 1 for generating a focussing signal. FIG. 2 illustrates the variation in the output of the photoelectric focussing detector 6 as a function of the quantity of light rays passing through objective lens 1 corresponding to an object to be photographed. The position P designates the position of the objective lens 1 providing proper focussing and a, and c designate non-responsive zones; that is, zones in which movement of the lens provides no relative change in the output of the detector 6. The symbol b designates a zone within which the signal indicating the focussed condition is generated and which hereinafter will be referred to as "the responsive zone." It is possible within the responsive zone to move the objective lens 1 to the proper focussing position based upon determination of the direction in which the output of the detector 6 varies as the objective lens 1 is moved; whereas it is impossible within the non-responsive zones to determine the direction in which the objective lens 1 may be moved in order to bring the objective lens close to the focussing position. This comes about since no variation occurs in the output of the focussing detector 6 within the responsive zones.

The photoelectric focussing detector 6 suitable for use in a single lens reflex photographic camera is described in detail in the specification and drawings of the cross-referenced application, and the description of the invention described herein is made with respect to such photoelectric focussing detector. The detector described in the referenced specification comprises a pair of photoconductive elements adapted for providing the output signal shown in FIG. 2 utilizing an image sensor of a self-scanning type and a light splitter by which the pair of photoconductive elements are combined with each other so as to be spaced a small distance from each other across a plane optically equivalent to the film plane. Such assembly is arranged at the position of the photoelectric focussing detector 6 shown in FIG. 1. To be described later, by thus arranging a pair of photoconductive elements slightly spaced apart from each other, it is possible to determine the direction in which the objective lens 1 must be moved in order to achieve focussing.

Figure 3:
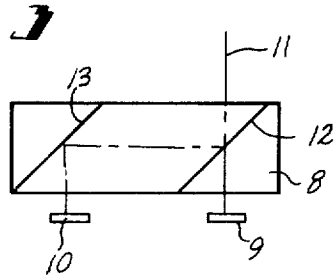
FIG. 3 is a schematic of a photoelectric focussing detector using two photoconductive elements.

FIG. 3 shown in schematic the photoelectric focussing detector disclosed in the cross-referenced application. A light splitter 8 has a semi-transparent mirror 12 oriented to be in the path of an optical axis 11. The light also includes a totally reflective mirror 13 that is substantially parallel to the semi-transparent mirror 12. Located below (as viewed in FIG. 3) the light splitter 8 are a pair of spaced apart photoconductive elements 9 and 10 adapted for providing in cooperation with an image sensor of the self-scanning type or the like, the output signal as illustrated in FIG. 2. Photoconductive element 9 is oriented to receive the optical rays that pass through the semi-transparent mirror 12 along the optical axis 11, and photoconductive element 10 is oriented to receive optical rays that are reflected from the semi-transparent mirror 12 and the reflective mirror 13.

Figure 4:
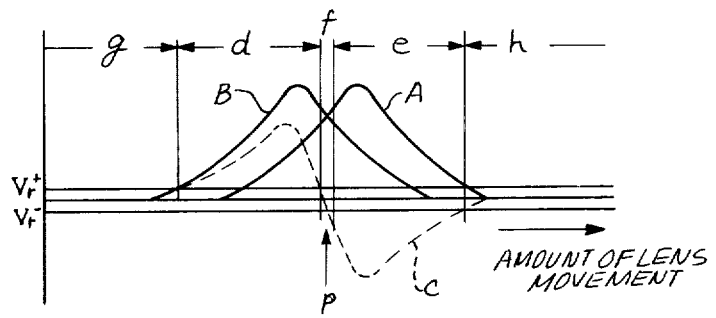
FIG. 4 is a diagram illustrating the output of the photoelectric detector of FIG. 3 as a function of the movement of the objective lens.

Hereinafter the photoconductive element 9 is referred to as the "front element," and the photoconductive element 10 is referred to as the "rear element." FIG. 4 illustrates the variation of the output waveform provided by the photoelectric elements 9 and 10 as the objective lens 1 is moved along its axis 1a. The waveform A corresponds to the output of the front element 9, the waveform B corresponds to the output of the rear element 10, and the waveform C corresponds to the difference between the output of the rear element 10 and the front element 9. The position P of the objective lens 1 indicates the point of proper focussing. Also shown in FIG. 4, are predetermined threshold values $V_r+$ and $V_r-$ that are located respectively above and below the abscissa. The intersection of the waveform C and the threshold values $V_r+$ and $V_r-$ define the zones d, e, f, g, and h. The zones d, e, and f are responsive zones within which it is possible to determine a proper direction in which the objective lens 1 is moved in accordance with the polarity of the waveform C in order to achieve proper focussing. The zones g and h are considered nonresponsive zones such that as long as the objective lens 1 is present within either of the nonresponsive zones, it is impossible to determine the proper direction in which the objective lens 1 is to be moved for proper focussing. The zone f is referred to as the focussing zone within which the position of the objective lens 1 lies in order to obtain proper focussing. The threshold values $V_r+$ and $V_r-$ are selected to provide a photographic camera of automatic focussing type with operation at high stability precision and speed. Preferably, the threshold values are set to be about 10% of the maximum output of the photoconductive elements. Such threshold values largely contribute with a stabilization not only of the width of the focussing zone f but also of control of the objective lens 1.

Figure 5:
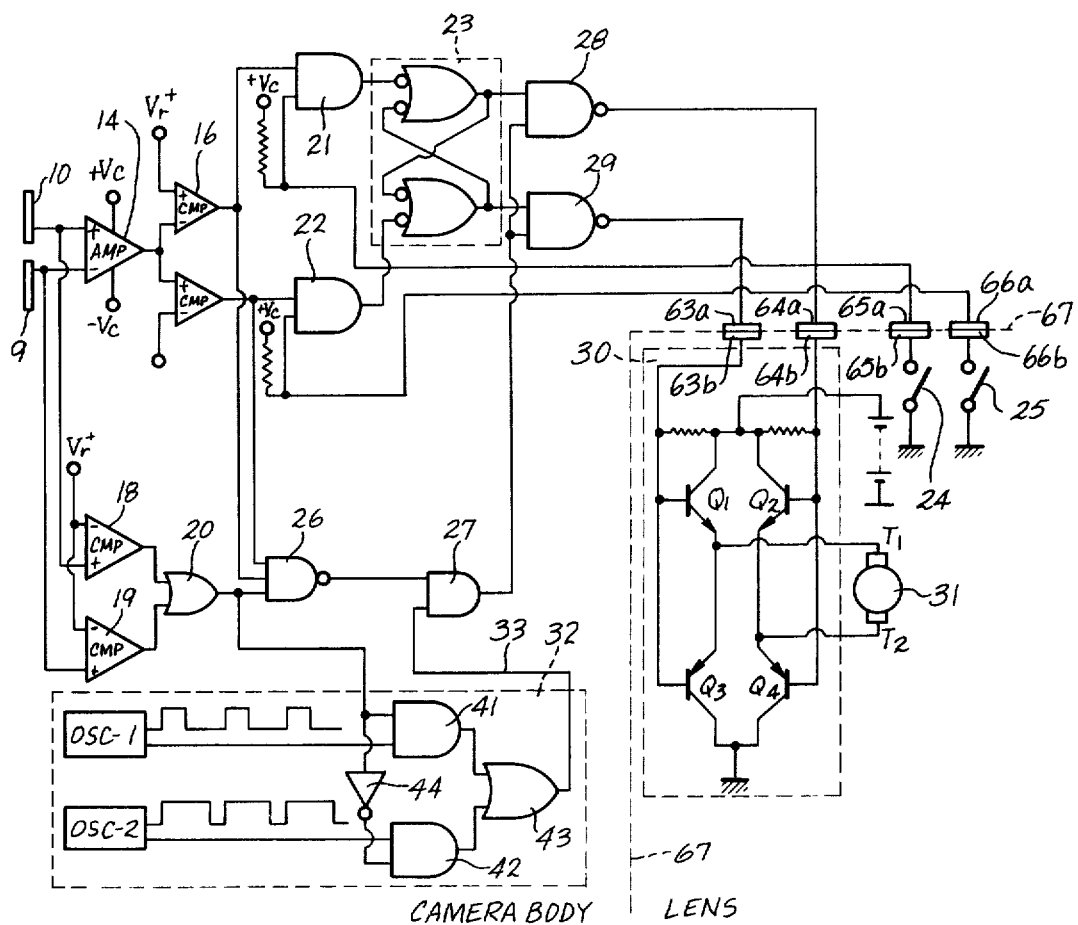
FIG. 5 is a circuit diagram illustrating an embodiment of the circuit arrangement incorporated into an embodiment of the photographic camera of automatic focussing type according to the present invention.

FIG. 5 shows a circuit diagram illustrating an embodiment of the present invention using the photoelectric focussing detectors shown in FIG. 3. The components shown in FIG. 5 above and to the left of a broken line 67 are located in the camera body and the components located to the right and below line 67 are located in the lens. The outputs of the photoconductive elements 9 and 10 are applied to the minus and plus inputs respectively of a conventional unity gain differential amplifier 14. The waveform C, shown in FIG. 4, is provided at the output terminal 15 of the amplifier 14. The output at terminal 15 is compared with the $V_r+$ and $V_r-$ thresholds in conventional comparators 16 and 17 respectively. The outputs of the photoconductive elements 9 and 10 are also compared with the $V_r+$ threshold in conventional comparators 19 and 18 respectively. The outputs of the comparators 18 and 19 form the inputs of a conventional OR gate 20, the output of OR gate 20 becomes HIGH when any one of the comparator 18 or 19 outputs exceed the threshold value $V_r+$. Thus, the output of OR gate 20 is HIGH within the responsive zones d, e, f and is LOW within the non-responsive zones g and h. A summary of the relationships between the outputs of comparators 16 and 17, gate 20 and their respective zones d to h is tabulated in FIG. 6. The output signals from comparators 16 and 17 serve as a control signal having a first characteristic, namely output signal from comparator 16 LOW and output signal from comparator 17 HIGH, in focussing zone d and a second characteristic, namely output signal from comparator 16 HIGH and output signal from comparator 17 LOW, in zone e. It is to be noted that in accordance with the tabulation of FIG. 6, the output of the comparator 16 being LOW causes the movement of the objective lens 1 towards the position for focussing an object at the minimum distance, while the output of comparator 17 being LOW causes the objective lens 1 to move towards the position for photographing an object at an infinite distance since in the zone d, the proper focussing is obtained by moving the objective lens 1 toward the minimum distance, and in the zone e toward the infinite distance.

The outputs of comparators 16 and 17 form inputs to conventional AND gates 21 and 22 respectively. The outputs of AND gates 21 and 22 form the inputs of a conventional flip-flop 23. A voltage source $V_C$ is switchably connected to another input of the AND gates 21 and 22. Switch 24 is coupled to the AND gate 21 through contact pair 65a,65b such that in the closed position, the AND gate input connected to the voltage source $V_C$ is connected directly to ground. Similarly, switch 25 is coupled to AND gate 22 through contact pair 66a,66b such that in the closed position, the AND gate input connected to the voltage source $V_C$ is connected directly to ground. For the condition that switches 24 and 25 are closed, (repesenting the absence of a TRUE or HIGH signal on the corresponding AND gate input) the AND gate output is FALSE or LOW. Switches 24 and 25 are adapted to be closed upon arrival of the objective lens 1 at the positions for photographing objects at the infinite distance and at the minimum distance respectively. Switches 24 and 25 are normally opened so that the AND gates 21 and 22 permit the outputs of the comparators 16 and 17 to be coupled directly to respective inputs of the flip-flop 23.

Figures 6, 7, 8:
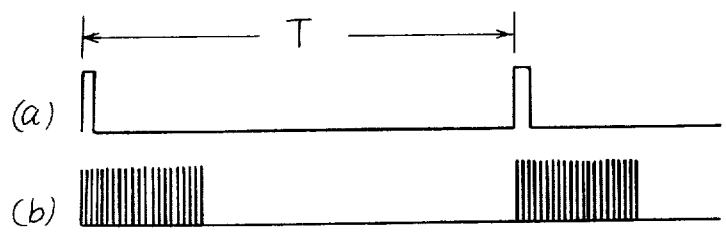
FIG. 6 is a table showing a relationship between selected outputs of the circuit illustrated by FIG. 5 and the responsive and non-responsive zones shown in FIG. 4.
FIG. 7 is a table showing a relationship between outputs of gates 28 and 29 shown in FIG. 5 and the movement of the objective lens.

As shown in the Table of FIG. 6, within the focussing zone f, the comparators 16 and 17 as well as the output of OR gate 20 have outputs that are HIGH. The output of comparators 16 and 17 and OR gate 20 are coupled to respective inputs of NAND gate 26. To be explained later, the output 33 of oscillator circuit 32 and the output of NAND gate 25 form the inputs to an AND gate 27. The output of AND gate 27 forms a common input to NAND gates 28 and 29. The outputs of flip-flop 23 are connected to respective inputs of NAND gates 28 and 29.

The outputs of AND gates 28 and 29 are coupled through contact pair 63a,63b and contact pair 64a,64b to respective inputs of a focussing motor drive circuit 30. The focussing motor drive circuit 30 comprises a pair of complementary connected NPN transistors Q1 and Q2 and a pair of complementary connected PNP transistors Q3 and Q4. The collectors of transistors Q1 and Q2 are coupled to a voltage source V, and the emitters of transistors Q1 and Q2 are connected respectively to the emitters of transistors Q3 and Q4. The collectors of Q3 and Q4 are connected to ground. A reversible focussing motor 31 is connected across the emitters of Q1 and Q2. The bases of transistors Q1 and Q3 are coupled to the output of NAND gate 29 and the bases of transistors Q2 and Q4 are connected to the output of NAND gate 28. The focussing motor 31 is a conventional lens driving motor known in the art, and is coupled (not shown) to objective lens 1 for moving the lens along the lens axis 1a. Any one of a number of presently known techniques may be used for coupling the motor 31 to the objective lens 1.

The tabulation of FIG. 7 shows the relationship between the outputs of NAND gates 28 and 29 and the direction towards which the focussing motor 31 moves the objective lens 1. For example, with the output of NAND gate 28 LOW and the output of NAND gate 29 HIGH, transistors Q1 and Q4 are forward biased so that the terminal T1 of motor 31 is connected to the source V, and the terminal T2 is connected to ground. Such connection causes the focussing motor 31 to move the objective lens 1 towards focussing at infinity. With the output of NAND gate 28 HIGH and the output of NAND gate 29 LOW, transistors Q2 and Q3 are forward biased such that now terminal T2 is connected to voltage source V and terminal T1 is connected to ground. This reversing of the motor terminals causes the motor to move the objective lens 1 for focussing at the minimum distance. When the lens is in focus, the output of NAND gate 26 is LOW, making the outputs from both of NAND gates 28 and 29 HIGH. This renders transistors Q1 through Q4 nonconducting, and thereby overrides motor drive circuit 30 and stops motor 31.

A dual oscillator circuit 32 forms a control circuit for controlling the speed of rotation of focussing motor 31 for causing the objective lens to move at a higher velocity within the non-responsive zones (see FIG. 4) and at a slower velocity within the responsive zones. The dual oscillator circuit 32 includes two conventional square-wave oscillators, i.e. OSC-1 and OSC-2. The oscillators OSC-1 and OSC-2 provide a rectangular wave output of the same frequency but having different duty cycles. For example, oscillator OSC-1 has a duty cycle of about 50%, whereas oscillator OSC-2 has a duty cycle of about 75%. The output of oscillator OSC-1 forms an input to AND gate 41. The output of oscillator OSC-2 forms an input of AND gate 42. The output of OR gate 20 forms an input to AND gate 44, and the output of the OR gate inverted by inverter 44 forms an input to AND gate 42. The outputs of AND gates 41 and 42 form inputs to OR gate 43. The output of OR gate 43 forms the output of the dual oscillator circuit 32.

The output of oscillator OSC-1 is applied to the input of AND gate 27 when the output of OR gate 20 is LOW. Even when the output of NAND gate 26 is HIGH, or the desired focussing is still not obtained, the focussing motor 31 is momentarily stopped when the outputs of oscillators OSC-1 or OSC-2 are LOW. Accordingly, the duty cycle of the oscillator OSC-1 may be set lower while the duty cycle of oscillator OSC-2 may be set higher in order that the focussing motor 31 rotates at a higher average speed when the objective lens 1 lies within any one of the non-responsive zones. When the output of OR gate 20 is LOW, the focussing motor 31 is rotated at a lower average speed when the objective lens 1 lies within any one of the responsive zones. For compensating for the movement of the objective lens 1 away from the focussing point as the objective lens 1 is moved in correspondence with the high speed rotation of focussing motor 31, either switch 24 or switch 25 is closed upon the arrival of the objective lens at the position corresponding to such switches. More specifically, the switch 24 is closed when the objective lens 1 reaches the position for focussing an object at infinity, whereas, the switch 25 is closed upon arrival of the objective lens at the position for focussing an object at a minimum distance. Accordingly, the input terminals of their respective gates 21 and 22 by virtue of the corresponding switch closures are set to the LOW state. As a result of the switch closure, the outputs of the flip-flop 23 are inverted so that the rotation of the focussing motor 31 is reversed so as to move the objective lens 1 in the proper direction for focussing.

According to the present invention with the aforementioned arrangement, the objective lens 1 is moved at a higher velocity when the objective lens is initially remote from the focussing point and at a lower velocity when initially near the focussing point so that the automatic focussing function can be achieved rapidly, precisely and with a high degree of stability even in photographic cameras of automatic focussing type being of relatively simple construction. This is true especially when an image of an object to be photographed or the objective lens is present or where an object to be photographed is mobile and is followed without disturbing the proper focussing of the object. An object to be photographed having its image initially present within any one of the non-responsive zones can be rapidly brought into any one of the responsive zones.

The photoelectric focussing detector relies upon light rays coming from an object to be photographed through the objective lens, and therefore, such detector is compatible with exchangeable lenses. Advantageously such detector is therefore optimal for the single lens reflex camera.

The photoelectric focussing detector element serving to be exposed to the light rays used for the present invention may be a cadmium sulfide (CdS) or the image sensor of the self-scanning type as long as such element provides the output as shown in FIG. 2.

Figure 9:
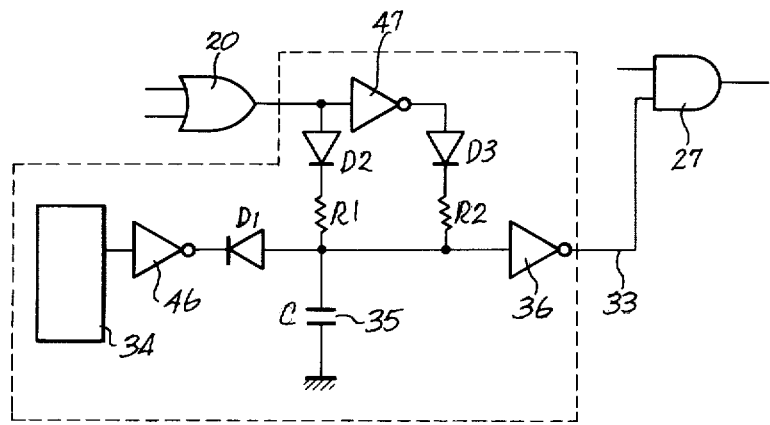
FIG. 9 is a schematic diagram of a circuit providing rectangular waveform outputs at different duty cycles between the responsive zones and the non-responsive zones in synchronization with the scan initiating signal for the image sensor of self-scanning type.

A photoelectric focussing detector using the image sensor of self-scanning type has been disclosed in the cross-reference U.S. application Ser. No. 117,932. Such application discloses the enlarging of the dynamic rage of the image sensor of the self-scanning type with respect to a quantity of light. According to the application, the luminance of an object to be photographed is detected by a separate element, and the level of such detected luminance determines a level of the signal serving to initiate the scanning operation of the image sensor of the self-scanning type. This feature enables a focussing function to be obtained over a wide range or a relatively dark object to be photographed to a relatively bright object to be photographed since the outputs from the detector provide the same waveform even with different average luminances so long as the object maintains the contrast. Briefly and in accordance with that disclosed in the referenced patent application Ser. No. 117,932, the signal serving to initiate scanning of the image sensor of the self-scanning type is generated by an oscillator as shown in FIG. 9. The oscillator is referred to hereinafter as the scanning function initiating signal oscillator indicated at 45. The output of the oscillator 45, as shown in FIG. 8(a), and a series of scanning pulses of the image sensor of the self-scanning type generated from an oscillator (not shown) and energized by the output signal shown in FIG. 8(a) is shown in FIG. 8(b). For an object having a high luminance, the scan initiating signal has a higher frequency, which provides a shorter period T (see FIG. 8), whereas for an object having a lower luminance, the scan initiating signal has a lower frequency resulting in a longer period T such that a quantity of object luminance induced accumulated electric charge in the image sensor can be kept relatively constant, and the output as shown in FIG. 2 is constant, indendent of the luminance of the object to be photographed. However, the fact that the object of lower luminance results in the corresponding lower frequency of the scan initiating signal means that the focussing detector cannot rapidly respond to such lower luminances. In consequence, the camera of the automatic focussing type incorporating such photoelectric focussing detector is characterized in that for an object of lower luminance, a velocity at which the objective lens 1 is moved is too high relative to the response of the focussing detector. More specifically, a "stopping signal," i.e., the removal of exitation to the focussing motor 31 may occur subsequent to the objective lens 1 being moved far beyond the point of proper focussing. Consequently, a direction reversing signal may occur resulting in the potential of hunting relative to the proper focussing point. In an extreme case, the objective lens 1 may be moved from any one of the non-responsive zones directly to the non-responsive zone on the opposite side before the focussing detector generates a signal indicating that the objective lens 1 has entered into the corresponding responsive zone with the result of a reciprocal movement of the objective lens 1 between the positions for photographing an object at infinity and an object at the minimum distance. To avoid such conditions, the objective lens 1 is moved at a velocity depending upon the luminance of the object to be photographed so that the objective lens 1 may be properly moved for objects having high luminance and for objects having low luminance. Advantageously, the circuit 45 shown in FIG. 9 provides for movement of the objective lens 1 for effective operation between high and low object luminances.

Figure 10:
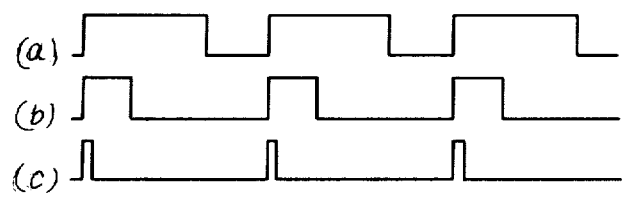
FIG. 10 shows selected outputs of the circuit of FIG. 9.

The circuit 45 thus forms an alternate embodiment of the dual oscillator circuit 32 shown in FIG. 5. The reference numeral 34 represents the scan initiating signal oscillator having as its output the waveform shown in FIG. 8(a). Capacitor 35 is coupled to the scan initiating signal oscillator 34 through inverting amplifier 46 and diode D1. Capacitor 35 is discharged in response to a clock pulse from the scan initiating signal oscillator. Capacitor 35 is charged through a diode D2 and resistance R1 when the objective lens 1 is present in any one of the responsive zones since the output from the OR gate 20 is HIGH. Capacitor 35 is also charged through diode D3 and resistor R2 when the objective lens 1 is present in any one of the non-responsive zones since the output of OR gate 20 is LOW and is inverted by inverter 47 coupled between the output of OR gate 20 and diode D3. Preferably, an inverter 36 coupled between capacitor 35 and the output 33 of the oscillator circuit 45 has a predetermined threshold value required to be exceeded in order for the inverter output to change states, i.e., invert during a period in which the capacitor 35 is charged to a voltage less than the threshold value of the inverter 36, the inverter output is HIGH. Accordingly, the value of the resistance R2 is selected to have a value slightly higher than the value of resistance R1 so that the output of inverter 36 is HIGH for a longer period when the objective lens 1 is present within any one of the non-responsive zones, and is HIGH for a shorter period of time when the objective lens is present within any one of the responsive zones. The long and short periods are shown by the waveforms of FIG. 10(a) and (b) respectively in synchronization with the scan initiating signal waveform as shown in FIG. 10(c).

The output of inverter 36 is applied to the input terminal of AND gate 27 so as to energize the focussing motor 31 during the period of time during which the inverter output is HIGH so that the objective lens 1 that lies initially within any one of the non-responsive zones is moved at a higher speed than when the objective lens lies initially within any one of the responsive zones. Furthermore, the objective lens 1 is moved at a higher velocity for an object providing a higher luminance than for an object providing a lower luminance because the period during which the output from the inverter 36 is HIGH is synchronized with the scan initiating signal pulse, and the frequency of this scan initiating signal pulse depends upon the luminance of the object to be photographed.

With the circuit arrangement and the operation thereof described above, the speed at which the objective lens 1 is moved depends upon the luminance of the object to be photographed so that even though the focussing detector cannot be rapidly responsive to an object of lower luminance, the objective lens 1 can be fed at a corresponding lower speed to obtain a reliable focussing signal. It is thus possible to obtain the photographic camera of automatic focussing type useful over a wide range of object luminance conditions.

With regard to the foregoing discussion, there is no particular problem for a photographic camera having a fixed lens which is constructed integrally with the camera body. However, for the photographic camera of the interchangeable lens type as most single lens reflex cameras in which the objective lens is interchangeable, a relatively complicated arrangement for connecting contacts is typically required in order to establish a connection between electrical elements incorporated in the camera body and the objective lens respectively. In order that the signal coupling between such elements is effectively achieved, proposed single lens reflex cameras have lens mounts that are provided with electric contacts so that information such as the F value and the diaphragm value adjusted by a preset ring may be transmitted between the objective lens and the camera body in the form of electric signals. It is understood that for transmission of large quantities of information, the number of contacts must be correspondingly increased. For purposes of automatic focussing in addition to the information regarding the F value and the diaphragm value, number of contacts for transmitting information between the interchangeable lens and the camera body must be further increased. Typically, the lens mount presents insufficient area for provision of the many contacts and the probability of malfunction due to improper contacts increases as the number of contacts increases. In consequent, it is desirable to obtain proper camera function and operation with a minimal number of contacts.

Accordingly, the present invention provides a photographic camera of automatic focussing type in which there are arranged a switch 24 associated with an object at infinite distance, a switch 25 associated with an object at a minimum distance, a focussing motor 31 and amplifier 30 for providing power to the focussing motor, and a source of electrical energy such as a battery for energization of these components within an interchangeable lens such that coupling of electrical contacts between the camera body and the interchangeable lens is achieved through only four contact pairs. Namely, two pairs of contacts through which the rotating direction and stopping of the focussing motor is indicated from the camera body to the interchangeable lens, and another two pairs of contacts through which the signals are transmitted from the switch 24 associated with the object at the infinite distance, and the switch 25 associated with the object at the minimum distance. With such arrangement, the interchangeable lens for the single lens reflex camera of automatic focussing type adapted to be operated under control of said or similar manner can be incorporated with the foregoing described elements.

Figure 11:
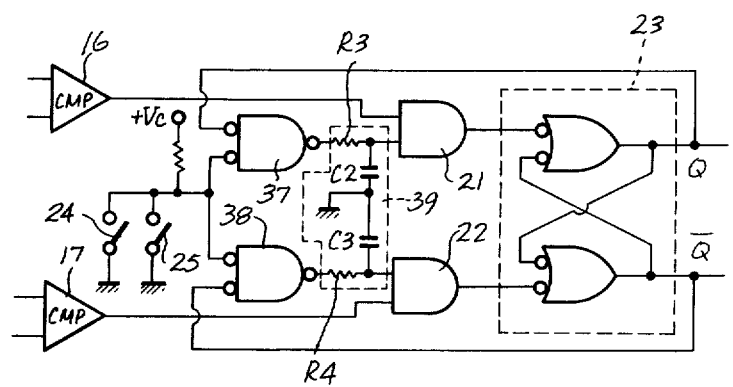
FIG. 11 is a schematic circuit diagram of an alternate embodiment of the contact arrangement according to the present invention.

An embodiment of the present invention in which the number of contacts is further decreased is illustrated in FIG. 11. The switch 24 associated with focussing an object at the infinite distance is connected in parallel with the switch 25 associated with focussing the object at the minimum distance so that the signals from both switches can be transmitted through a single contact pair to the camera body. The circuit according to FIG. 11 operates as follows. Output signals from NAND gates 37 and 38 are applied through a delay circuit 39 comprising capacitors C2 and C3 and resistors R3 and R4 to the inputs of AND gates 21 and 22 respectively, the AND gate 21 being previously connected to switch 24 which was associated with the object at the infinite distance, and the AND gate 22 being previously connected to switch 25 associated with the object at the minimum distance; then AND gate 37 serves to invert the state of the flip-flop 23 via the AND gate 21 for reversing the rotation of the focussing motor 31 when the output Q of the flip-flop 23 (indicative of the direction of rotation of the focussing motor) is LOW. Correspondingly, the switch 24 or the switch 25 is in the closed condition. During a period in which the Q output of flip-flop 23 is LOW, the focussing motor is rotating in a direction so as to move the objective lens 1 towards focussing the object at the infinite distance and therefore only switch 24 effects control of the focussing action. During the period in which the output Q of the flip-flop 23 is LOW, only switch 25 effects control of the focussing action since the objective lens 1 is being moved toward the minimum distance.

Thus, the NAND gates 37 and 38 logically detect the output state of the flip-flop 23, and the operation of the switch 24 or the switch 25 functions to invert the rotation of the focussing motor to achieve proper direction. The delay circuit 39 delays the output of the NAND gates 37 or 38 to the inputs of AND gates 21 and 22 respectively. In the absence of such delay upon the closure of switch 24 during the period in which the Q output of flip-flop 23 is LOW, the AND gate 21 generates a "SET" signal with which the flip-flop outputs Q and Q are converted into the states HIGH and LOW, respectively, and the conversion of Q into LOW causes the AND gate 22 to generate a resetting signal with which the state of the flip-flop 23 is converted. Repetition of such operation causes the circuit to oscillate, and as a result, the objective lens 1 is held at the position of focussing for the infinite distance or the minimum distance. To avoid such phenomena, the change of state of flip-flop 23 is delayed until the objective lens 1 is moved in a direction to open either the switch 24 or the switch 25.

The delay circuit 39 achieves this by delaying the setting or resetting signal generated from the NAND gates 37 and 38 until the objective lens 1 begins to move in the opposite direction. Use of the delay circuit 39 enables the setting or resetting signal to be applied to the flip-flop 23 with a time delay. Application of the corresponding delayed signals to the flip-flop 23 results in a slightly slower operation. However, the present invention provides the aforementioned advantages that the number of contacts between the interchangeable lens and the camera body can be minimized. That is, the desired transmission of the signals can be achieved through a total of three contacts, and the malfunctions resulting from bad electrical contacts is reduced, and the lens mount can be simplified in its construction.

What is claimed is:

1. An interchangeable lens photographic camera of automatic focussing type, capable of focussing objects, between a minimum and an infinite focussing distance comprising:

a camera body;

an interchangeable lens housing removably fitting in the camera body, said lens housing having a movable lens, a first switch for providing a signal associated with focussing an object at the infinite distance and a second switch for producing a signal associated with focussing an object at the minimum distance;

a reversible focussing motor located in the lens housing and coupled to the lens for moving the lens for focussing objects lying between the minimum and infinite distance;

electrical drive means located in the lens housing for driving the focussing motor responsive to two control signals indicating together the desired presence and direction of rotation of the focussing motor;

means in the camera body for generating two control signals indicating the presence and direction of rotation of the focussing motor;

first and second pairs of contacts, coupled between the lens housing and the camera body, for transmitting the respective two control signals from the camera body to the drive means in the lens housing; and third and fourth pairs of contacts, coupled between the lens housing and the camera body, for transmitting the signals, produced by the first and second switchs, respectively, from the lens housing to the generating means in the camera body, said pairs of contacts being oriented on the lens housing relative to each other for providing signal coupling between the lens housing and the camera body.

2. An interchangeable lens photographic camera of automatic focussing type, capable of focussing objects, between a minimum and an infinite focussing distance comprising:

a camera body;

an interchangeable lens housing removably fitting in the camera body, said lens housing having a movable lens, a first switch for providing a signal associated with focussing an object at the infinite distance and a second switch for producing a signal associated with focussing an object at the minimum distance, said first and second switches being connected in parallel;

a reversible focussing motor located in the lens housing and coupled to the lens for moving the lens for focussing objects lying between the minimum and infinite distance;

electrical drive means located in the lens housing for driving the focussing motor responsive to two control signals indicating together the desired presence and direction of rotation of the focussing motor;

means in the camera body for generating two control signals indicating the presence and direction of rotation of the focussing motor;

first and second pairs of contacts coupled between the lens housing and camera body for transmitting from the camera body to the drive means in the lens housing the respective two control signals; and a third pair of contacts coupled between the lens housing and the camera body for transmitting from the lens housing to the generating means in the camera body, the signals produced by the first and second switches, wherein the pairs of contacts are arranged on the lens housing at positions relative to each other for providing signal coupling between the lens housing and the camera body.

3. In a photographic camera having a lens translatable for focussing purposes, automatic focussing apparatus comprising:

a reversible motor connected to the lens to translate the lens between an infinite focus position and a minimum focus position;

means for generating a control signal having a first characteristic within a first range of lens positions adjacent to the in focus lens position between the in focus lens position and the infinite focus position and a second characteristic within a second range of lens positions adjacent to the in focus position between the in focus position and the minimum focus position, the sum of the first and second ranges being less than the displacement between the minimum focus and the infinite focus positions;

a bistable device having a first stable state and a second stable state;

means responsive to the bistable device for driving the motor toward the infinite focus position when the bistable device is in the first state and for driving the motor toward the minimum focus position when the bistable device is in the second state;

means overriding the motor driving means for stopping the motor when the lens is in focus;

means responsive to the first characteristic of the control signal for placing the bistable device in the second state;

means responsive to the second characteristic of the control signal for placing the bistable device in the first state;

means for changing the state of the bistable device when the lens reaches the infinite focus position or the minimum focus position.

4. The apparatus of claim 3, in which the camera has a camera body and a lens housing removably fitting in the camera body, the lens, the motor, and the motor driving means are located in the lens housing and the remaining recited elements are located in the camera body.

5. The apparatus of claim 4, in which the bistable device has first and second output terminals and the motor driving means has first and second input terminals, the apparatus additionally comprising a first pair of contacts connecting the first output terminals of the bistable device to the first input terminal of the motor driving means and a second pair of contacts connecting the second output terminal of the bistable device to the second input terminal of the motor driving means, one contact of each pair being located on the camera body and one contact of each pair being located on the lens housing.

6. The apparatus of claim 5, in which the state changing means comprises first and second limit switches located in the lens housing, the first limit switch lying in the path of the lens at the infinite focus position and the second limit switch lying in the path of the lens at the minimum focus position, and the bistable device has first and second input terminals for controlling the state thereof, the apparatus additionally comprising a third pair of contacts connected between the first limit switch and the first input terminal of the bistable device such as to change the bistable device from the first state to the second state, and a fourth pair of contacts connected between the second limit switch and the second input terminal of the bistable device such as to change the state of the bistable devce from the second state to the first state, one contact of each of the third and fourth pairs being located on the camera body and the other contact of each of the third and fourth pairs being located on the lens housing.

7. The apparatus of claim 3, in which the state changing means comprises first and second limit switches located in the lens housing, the first limit switch lying in the path of the lens at the infinite focus position and the second limit switch lying in the path of the lens at the minimum focus position, the bistable device has first and second input terminals for controlling the state thereof, the apparatus additionally comprising a first pair of contacts connected between the first limit switch and the first input of the bistable device such as to change the bistable device from the first state to the second state and a second pair of contacts between the second limit switch and the second input terminal of the bistable device such as to change the state of the bistable device from the second state to the first state, one contact of each pair being located on the camera body and the other contact of each pair being located on the lens housing.

8. The apparatus of claim 3, in which the motor drives the lens toward the infinite focus position responsive to an applied drive signal having a first polarity and drives the lens toward the minimum focus position responsive to an applied drive signal having a second polarity opposite to the first polarity, and the motor driving means comprises means responsive to the bistable device for applying to the motor a drive signal having the first polarity when the bistable device is in the first state and means responsive to the bistable device for applying to the motor a drive signal having the second polarity when the bistable device is in the second state.

9. The apparatus of claim 5, in which the state changing means comprises first and second limit switches located in the lens housing, the first limit switch lying in the path of the lens at the infinite focus position and the second limit switch lying in the path of the lens at the minimum focus position, the bistable device has first and second input terminals for controlling the state thereof, the apparatus additionally comprising a third pair of contacts connected between both of the first and second limit switches and both of the first and second inputs to the bistable device such as to change the bistable device to the other state when either of such limit switches close, one contact of the third pair being located on the camera body and the other contact of the third pair being located on the lens housing.

10. The apparatus of claim 9, additionally comprising means for preventing successive changes of state of the bistable device at time intervals less than the time interval required to reopen the limit switches after closure thereof.

* * * * *